(12) United States Patent
Kahn

(10) Patent No.: US 12,236,250 B2
(45) Date of Patent: Feb. 25, 2025

(54) SYSTEMS AND METHODS FOR VERIFYING PROGRAM STATES

(71) Applicant: Samsung Electronics Co., Ltd., Suwon-si (KR)

(72) Inventor: Caroline D. Kahn, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 79 days.

(21) Appl. No.: 17/581,766

(22) Filed: Jan. 21, 2022

(65) Prior Publication Data
US 2023/0176878 A1    Jun. 8, 2023

Related U.S. Application Data

(60) Provisional application No. 63/285,861, filed on Dec. 3, 2021.

(51) Int. Cl.
| | |
|---|---|
| G06F 9/44 | (2018.01) |
| G06F 9/445 | (2018.01) |
| G06F 11/34 | (2006.01) |

(52) U.S. Cl.
CPC ...... *G06F 9/44589* (2013.01); *G06F 9/44505* (2013.01); *G06F 9/44578* (2013.01); *G06F 11/3457* (2013.01)

(58) Field of Classification Search
None
See application file for complete search history.

(56) References Cited

U.S. PATENT DOCUMENTS

| | | | |
|---|---|---|---|
| 7,865,586 B2 | 1/2011 | Cohn | |
| 8,223,770 B2 | 7/2012 | Wray et al. | |
| 8,713,545 B2 | 4/2014 | Fiorini | |
| 9,424,419 B1 | 8/2016 | Kruse | |
| 9,804,945 B1 * | 10/2017 | Allen | G06F 8/00 |

(Continued)

FOREIGN PATENT DOCUMENTS

| | | |
|---|---|---|
| CN | 110618912 A | 12/2019 |
| WO | WO 2020/062981 A1 | 4/2020 |

OTHER PUBLICATIONS

CN 112817597 (Year: 2021).*

(Continued)

*Primary Examiner* — Insun Kang
(74) *Attorney, Agent, or Firm* — Lewis Roca Rothgerber Christie LLP

(57) ABSTRACT

Systems and methods for checking program code are disclosed. The method includes executing a first check of the program code, and making a first determination about the first check. Metadata is stored based on making the first determination. A second check of the program code is run based on the metadata, and a result of the second check is stored in memory. The program code is executed based on the second check. In some embodiments, the method for checking program code includes running a simulation of a check of the program code by a processing device; storing a result of the simulation in memory; executing the check of the program code outside of the simulation; making a determination about the check outside of the simulation; retrieving a result stored in the memory based on the determination; and executing the program code based on the check.

15 Claims, 9 Drawing Sheets

(56) References Cited

U.S. PATENT DOCUMENTS

| | | |
|---|---|---|
| 9,804,952 B1 | 10/2017 | Cohen et al. |
| 10,530,711 B2 | 1/2020 | Yu et al. |
| 10,581,729 B2 | 3/2020 | Wu et al. |
| 10,742,446 B2 | 8/2020 | Tillotson et al. |
| 10,754,707 B2 | 8/2020 | Tamir et al. |
| 10,762,193 B2 | 9/2020 | Lev-Ran |
| 10,785,146 B2 | 9/2020 | Tillotson et al. |
| 10,831,456 B1* | 11/2020 | Bhownani ............... G06F 8/427 |
| 10,868,732 B2 | 12/2020 | Mishra et al. |
| 11,048,544 B2 | 6/2021 | Jain |
| 2003/0115553 A1* | 6/2003 | Master ................... G06F 9/325 |
| | | 712/E9.035 |
| 2011/0004867 A1* | 1/2011 | Holden ............... G06F 11/3676 |
| | | 717/127 |
| 2015/0046425 A1 | 2/2015 | Lin et al. |
| 2016/0094460 A1 | 3/2016 | Shelar et al. |
| 2016/0335110 A1 | 11/2016 | Paithane et al. |
| 2019/0324882 A1 | 10/2019 | Borello et al. |
| 2020/0065130 A1 | 2/2020 | He et al. |
| 2020/0257611 A1 | 8/2020 | Hortala et al. |
| 2020/0274952 A1* | 8/2020 | Waskiewicz ............ G06F 9/445 |
| 2021/0064443 A1* | 3/2021 | Tsirkin ................ G06F 9/45525 |
| 2022/0318089 A1* | 10/2022 | Sridharan ............. G06F 3/0619 |
| 2023/0119536 A1* | 4/2023 | Cosentino ............. G06F 9/4406 |
| | | 718/104 |

OTHER PUBLICATIONS

Rediger, Jan-Erik, "Network Function Offloading in Virtualilzed Environments," Master Thesis, RWTH Aachen University, Germany, Jul. 5, 2017, 71 pages.

EPO Extended European Search Report dated Apr. 18, 2023, issued in corresponding European Patent Application No. 22208029.3 (10 pages).

* cited by examiner

SYSTEMS AND METHODS FOR VERIFYING PROGRAM STATES

CROSS-REFERENCE TO RELATED APPLICATION(S)

The present application claims priority to and the benefit of U.S. Provisional Application No. 63/285,861, filed Dec. 3, 2021, entitled "STATEFUL EBPF VERIFIER," the entire content of which is incorporated herein by reference.

FIELD

One or more aspects of embodiments according to the present disclosure relate to computational storage devices, and more particularly, to verifications of programs offloaded to the computational storage device.

BACKGROUND

It may be desirable to use a computational storage device (for example, a solid state drive (SSD) with an embedded processor or Field Programmable Gate Array (FPGA)), for various data processing tasks, as such a storage device may help provide efficient and cost-effective data processing solutions. For example, the computational storage device may provide a platform for executing programs or runtime downloadable functions that may otherwise be executed by a host CPU processor. Security issues may arise when certain types of programs are run by the computation storage device. It may be desirable therefore to run checks of the programs to verify that the programs are safe to run.

The above information disclosed in this Background section is only for enhancement of understanding of the background of the present disclosure, and therefore, it may contain information that does not form prior art.

SUMMARY

Embodiments of the present disclosure are directed to a method for checking program code, the method comprising: executing a first check of the program code; making a first determination about the first check; storing metadata based on making the first determination; running a second check of the program code based on the metadata; storing a result of the second check in memory; and executing the program code based on the second check.

According to one embodiment, the method includes running a third check of the program code; retrieving the result in response to running the third check; and executing the program code. The third check may be in response to executing the program code, wherein the result is retrieved from memory in response to the third check.

According to one embodiment, the program code is generated in a user space of a processing device, and executed in a kernel space of the processing device.

According to one embodiment, the first check includes a check of configuration data and is performed in response to a first command to load the program code, and the second check is in response to a second command to execute the program code.

According to one embodiment, the first check and the second check are performed by a computational storage device.

According to one embodiment, the first check is performed by a host computing device, and the second check is performed by a computational storage device in communication with the host computing device.

According to one embodiment, the metadata includes memory access data retrieved from the program code.

According to one embodiment, the first determination is a determination regarding availability of configuration data for making the first check.

Embodiments of the present disclosure are also directed to a method for checking program code, the method comprising: running a simulation of a check of the program code by a processing device; storing a result of the simulation in memory; executing the check of the program code outside of the simulation; making a determination about the check outside of the simulation; retrieving a result stored in the memory based on the determination; and executing the program code based on the check.

According to one embodiment, the executing of the check is in response to a command to execute the program.

According to one embodiment, the determination is a determination that configuration data is needed for making the check.

According to one embodiment, the result is stored in association with the configuration data.

According to one embodiment, in running the simulation, a determination is made that configuration data is needed for the check, the method further comprising: selecting configuration data; and running the simulation of the check based on the configuration data.

Embodiments of the present disclosure are also directed to a system for checking program code, the system comprising: one or more processors; and one or more memory devices. The one or more memory devices store instructions that, when executed by respectively the one or more processors, cause the one or more processors to respectively: execute a first check of the program code; make a first determination about the first check; store metadata based on making the first determination; run a second check of the program code based on the metadata; store a result of the second check in memory; and execute the program code based on the second check.

As a person of skill in the art should recognize, embodiments of the present disclosure provide verification of programs loaded and executed by the computational storage device, while minimizing negative impact on the acceleration performance of the device.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
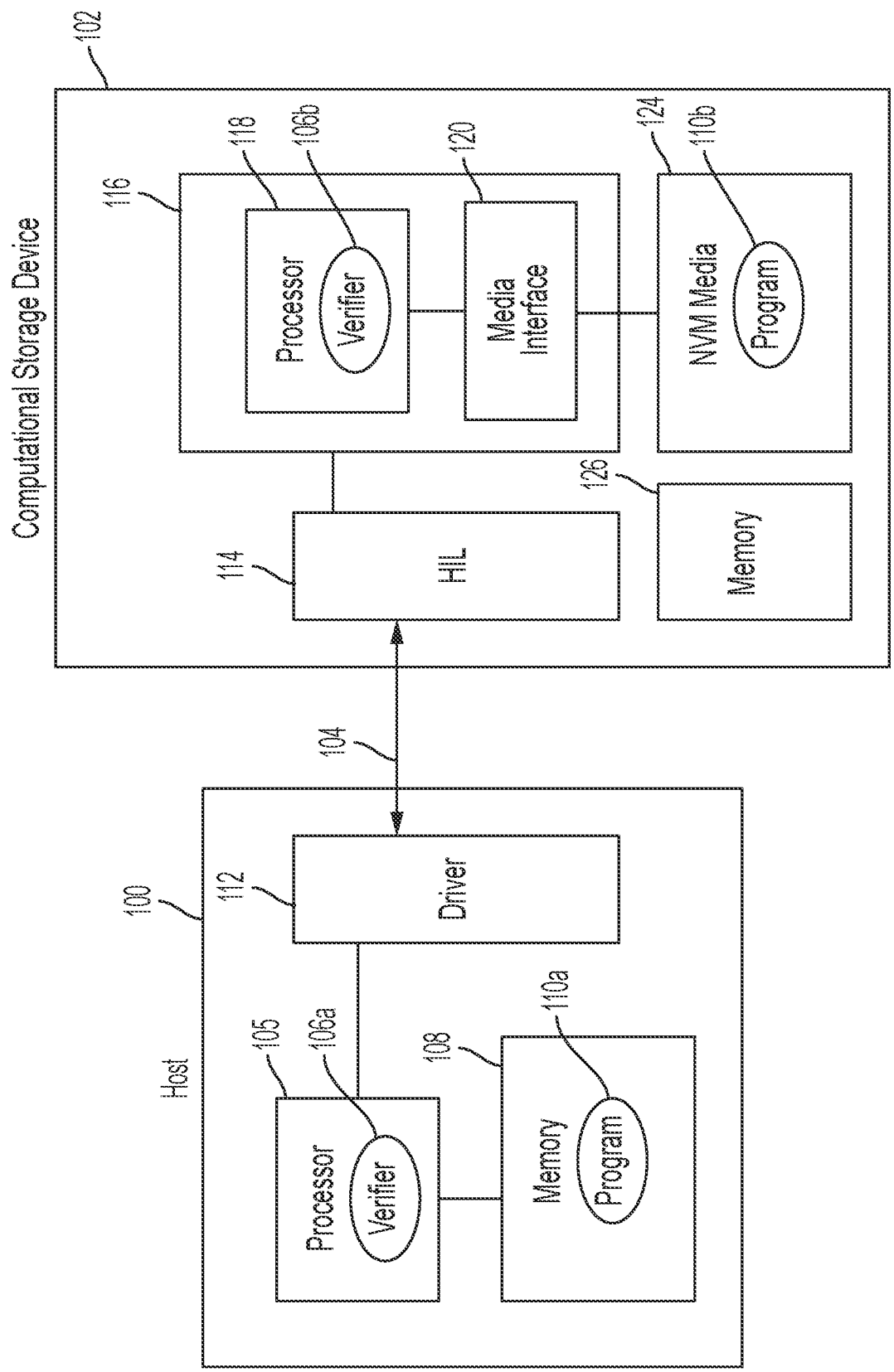
FIG. 1 is block diagram of a system for verifying program states according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

As computational storage technology evolves to provide a flexible framework for executing different types of programs or runtime downloadable functions (collectively referred to as programs), security may become a concern. Thus, it may be desirable to perform verification of the program (for example, program states) to ensure that the program is safe to run. The verification that is performed, however, should be balanced against the acceleration performance to be achieved by the computational storage device.

A program that may be executed by the computational storage device may be a program that is generated in user space, but executed in kernel space (for example, in a virtual machine environment inside the kernel space). Such a program may be, for example, an extended Berkeley Packet filter (eBPF) program that may be used for processing and filtering packets. Although the various embodiments described herein use eBPF as an example, the embodiments are not limited thereto, and may extend to other user programs that may be loaded and executed in the kernel space, or extend to programs that execute in user-space such as, for example, user-space BPF (uBPF).

A program generated in the user space may contain errors which, when executed in the kernel, may cause the kernel to crash. It may be desirable, therefore, to check the program prior to execution. In some aspects, a verification mechanism performs a series of checks of an eBPF program to verify that the program is safe to run. The verification mechanism of some aspects performs the check once, at program load/activation stage. When all configuration data needed by the program is available at program load time, the one-time verification at this time may be sufficient.

A situation may arise where configuration data for an offloaded device is not available at program load time. The configuration data may instead be transmitted to the computational storage device at program execute time, with an express execute command. In this case, running a state check/verification at the program load stage may be unsuccessful in verifying program instructions that require configuration data.

In general terms, embodiments of the present disclosure are directed to systems and methods for conducting program state checks that may be loaded and executed by a computational storage device, based on express instructions from the host. In one embodiment, the state checks are run multiple times from different contexts, including at a program load stage and a program execution stage. In one embodiment, the state check at program execution stage is conducted in a manner that minimizes negative performance impact of the computational storage device.

FIG. 1 is block diagram of a system for verifying program states according to one embodiment. The system may include a host computing device 100 coupled to a computational storage device 102 over a storage interface bus 104. The computational storage device 102 may be a solid state drive (SSD) with an embedded processor, such as a field programmable gate array (FPGA), an SSD controller, an application specific integrated circuit (ASIC), a discrete co-processor, combinations thereof, and/or the like. In some aspects, the storage interface bus 104 may be, for example, a Peripheral Component Interconnect Express (PCIe) bus. In one embodiment, the host device 100 transfers and receives data to and from the storage device 102 over the storage interface bus 104, using a storage interface protocol. The storage interface protocol may be, for example, a non-volatile memory express (NVMe) protocol or any other suitable protocol.

In one embodiment, the host 100 includes a processor 105 coupled to a memory 108. The processor 105 may be configured to run one or more programs that are stored in the host memory 108.

In one embodiment, the host 100 also includes a device driver 112 configured to interface with the storage device 102. The device driver 112 may be implemented as software instructions that are stored in the host memory 108, and which are executed by the host processor 105. In one embodiment, the device driver 112 may be configured to provide an interface between the host 100 and the storage device 102. The interface may be for offloading a program 110a in host, to reside as a program 110b in the computational storage device 102. The offloading may, in some examples, lead to efficient and cost-effective data processing of data. The offloaded program 110a, 110b (collectively referenced as 110) may be, for example, an eBPF program or any other program generated by the host 100 in user space, but executed in the kernel space.

In one embodiment, the storage device 102 includes a host interface layer (HIL) 114 for interfacing between the device driver 112, and a device control subsystem 116. The device control subsystem 116 may include, without limitation, one or more processors 118 and one or more media interface(s) 120. In one embodiment, the one or more processors 118 interact with NVM media 124 over the media interface 120 for effectuating write or read actions. The NVM media 124 may include one or more types of non-volatile memory such as, for example, flash memory.

In one embodiment, the storage device 102 further includes an internal memory 126 for short-term storage or temporary memory during operation of the storage device 102. The internal memory 126 may include a DRAM (dynamic random access memory), SRAM (static random access memory), and/or DTCM (Data Tightly Coupled Memory).

In some embodiments, the storage device 102 is inside a slot of a chassis (not shown) that includes an Ethernet switch, a baseboard management controller (BMC), and a PCIe switch. The chassis may include first and second slots having respectively first and second storage devices 102 in the first and second slots.

The Ethernet switch may provide an Ethernet connection to the storage device 102 (for example, Ethernet SSD) over a midplane, and the PCIe switch may provide a management interface to the storage device over the midplane. The BMC can program the storage device 102 according to an instruction given by a system administrator. The BMC can manage the internal components of the chassis including the Ethernet switch, the PCIe switch, and the storage device 102. The BMC can support PCIe and/or system management bus (SMBus) interfaces for the system management. The BMC can configure the storage device 102 and program the Ethernet switch. In some embodiments, the Ethernet switch provides network connectivity between the host 100 and the storage device 102.

In one embodiment, the program 110 is loaded onto the NVM media 124, and retrieved for execution by the processor 118 via the media interface 120. For example, the program 110 may be loaded from the NVM media 124 onto the internal memory 126 in response to one or more commands from the driver 112.

The commands from the driver 112 may be for loading/activating and/or executing the program 110. In one embodiment, the execute command is expressly transmitted by the host 100 separately from the load command. Configuration parameters needed by the program may not be available when the load command is transmitted by the driver 112. For example, memory addresses, memory size, and/or the like, may not be available upon program load. The configuration parameters may instead be transmitted by the driver 112 with the execute command. In this scenario, a check of program instructions that require configuration data may not be possible at program load time.

The above issue may be addressed via verification logic that maintains program state data so that the verification logic may be invoked one or more times, to start and continue a verification operation of the program 110. The verification logic is hereinafter referred to as a stateful verifier 106a, 106b (collectively referenced as 106).

In one embodiment, a first check (first verifier run) may be performed when the program 110 is loaded, and a second check (second verifier run) may be performed when the program is executed. The checks of the program 110 may be performed by the computational storage device 102 (for example, via the verifier 106b), by the host 100 (for example, via the verifier 106a), or a combination of both. The checks may verify, for example, that the program 110 will run to completion without causing lockups. Other checks may include checks of valid register states, memory boundaries, and/or the like.

In one embodiment, the stateful verifier 106 maintains state data for minimizing program state checks during the program execute (for example, input/output (IO)) stage which may negatively affect performance of the computational storage device 102. The state data may include: 1) list of checks that were and/or were not completed in the first run; 2) metadata of checks that were not completed on the first run; and 3) configuration data (once available) and results of checks using the metadata. The state data may be created upon the first verifier run (for example, upon load of the program), and be maintained for the life of the program until a new program is loaded into the computational storage device 102, or the program is unloaded. When multiple computational storage devices are installed in the slots of a chassis, state data is maintained per slot/computation storage device 102.

In one embodiment, the stateful verifier 106 attempts to run all program state checks during the first run of the verifier in response to a load command from the host 100. A check of the program 110 that does not require configuration data may complete during the first run with a pass or no pass. For the checks of the program 110 where the configuration data (for example, memory size) is not available, the stateful verifier 106 may gather metadata (for example, memory offsets) from the program 110 and store it in a first table (for example, Metadata Table). In this manner, the program 110 is traversed once during the first run, avoiding the traversal of the program a second time when the configuration data becomes available. In one embodiment, an indication of whether a check was completed or not, may be stored in a second table (for example, Done Table).

The stateful verifier 106 may perform a second run of the program state checks in response to detecting a change in the context of the program 110. For example, the second run may be performed in response to a first execute command from the host 100. In one embodiment, the stateful verifier 106 searches the Done Table for checks of the program 110 that have not been completed, verifies that configuration data that prevented the checks from completing are available, and runs those checks using the saved metadata. The configuration and results of the checks are stored in a third table (for example, Cache Table) stored in the memory 126.

The stateful verifier 106 may perform a third run of the program state checks in response to a further change in the context of the program 110. The further change may be triggered by a second execute command from the host 100. In one embodiment, the stateful verifier 106 may be configured to check the Cache Table for prior check results before re-running a check of the program 110. If a result of the check is available in the Cache Table, the check is not re-run. This may help avoid unnecessary performance slowdown, due to running of checks, of the execution of time-sensitive input/output commands by the computational storage device 102.

Figure 2:
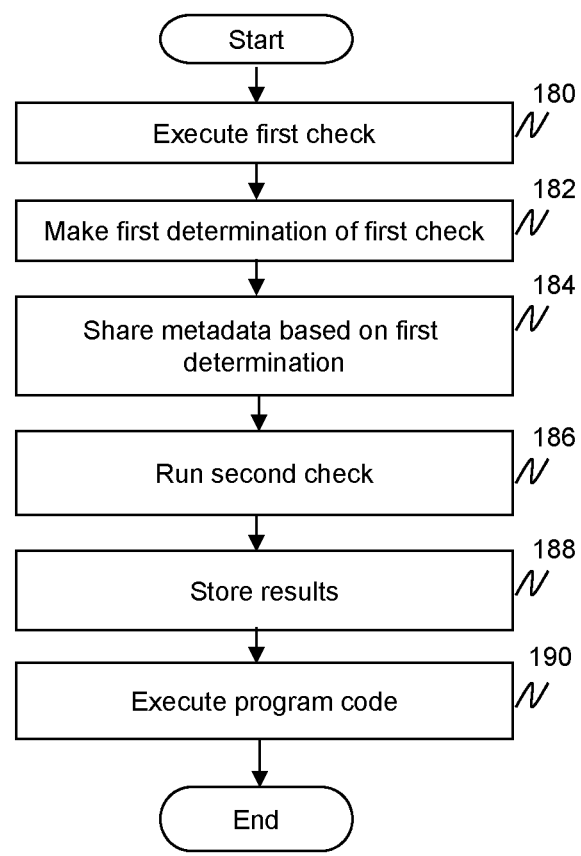
FIG. 2 is a flow diagram of a general process for checking program code according to one embodiment.

FIG. 2 is a flow diagram of a general process for checking program code according to one embodiment. The process starts, and in act 180, the stateful verifier 106 executes a first check of the program code. The first check may be in response to a command to load the program, and may check for validity of the program instructions.

In act 182, the stateful verifier 106 makes a first determination of the first check. The first determination may be a determination regarding availability of configuration data needed to perform the first check. For example, the determination may be that configuration data is needed to perform the first check. The configuration data may be, for example memory size.

In act 184, metadata of the check that requires configuration data is gathered from the program and stored in memory. The metadata may be, for example, memory offsets.

In act 186, the stateful verifier 106 executes a second check of the program code. The second check may be in response to a command to execute the program. In one embodiment, configuration data is available during the second check, and the check that could not be performed during the first check may now be performed during the second check using the metadata stored in memory. In one embodiment, the checks that were completed during the first check are not repeated during the second check.

In act 188, the stateful verifier 106 stores the results of the second check in memory. The result may be that the check has passed or failed.

If the result of the second check is a pass, the program code is executed in act 190. In one embodiment, the program code is executed in the kernel space.

Figure 3:
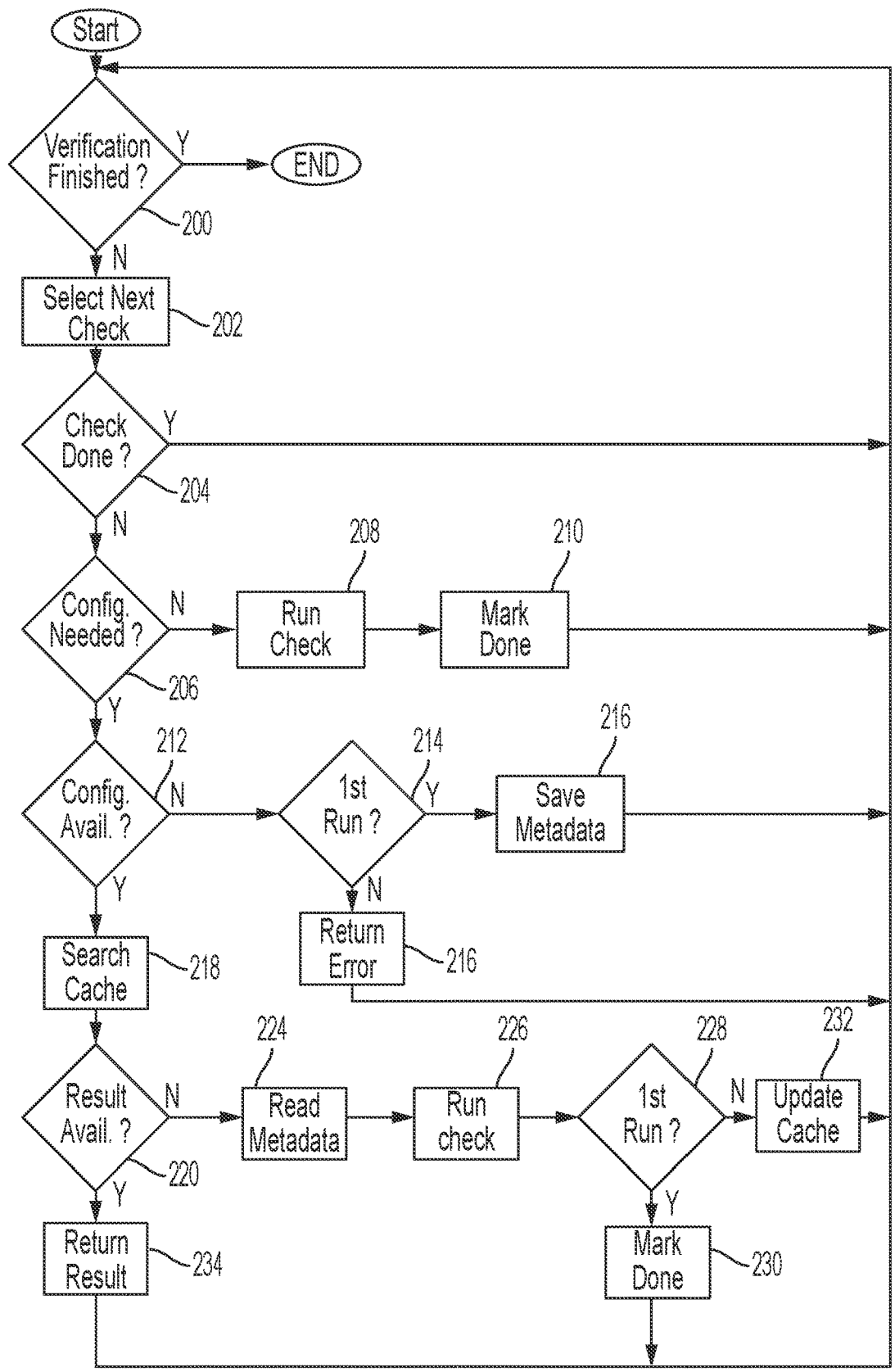
FIG. 3 is a flow diagram of a device-driven process for verifying program states via a stateful verifier in a computational storage device, according to one embodiment.

FIG. 3 is a flow diagram of a device-driven process for verifying program states via the stateful verifier 106b in the computational storage device 102, according to one embodiment. The process starts, and in act 200, the stateful verifier 106b determines whether all checks of the program 110 have been run, and the verification process is complete. If the answer is YES, and all checks have passed, the program 110 may be loaded and/or executed by the computational storage device 102. In one embodiment, the loading and executing are in response to express commands from the host 100.

If the verification process is not complete, the stateful verifier 106b selects, in act 202, a check to perform. The check may be one of various preset checks configured to be run by the stateful verifier 106b. For example, the check may be to determine whether a program instruction is valid. In this regard, the stateful verifier 106b may be configured to simulate execution of a program instruction, and check register and stack states before and after simulating the execution to verify the states.

In act 204, the stateful verifier 106b determines whether the selected check has already been performed. The answer is presumed to be NO for a first run of verification process (for example, in response to a program load command). For subsequent runs of the verification process (for example, in response to a program execute command), the stateful verifier 106b may check the Done Table for identifying those checks that have been performed during the first run, and identifying those checks that have not been run. In one embodiment, checks that require configuration data are not completed in the first run, and hence, not marked as being completed in the Done Table. The configuration information may be, for example, memory boundary information, and the check may be for determining whether a memory access instruction is within the configured boundary.

Referring again to act 204, if the check has not yet been performed, the stateful verifier 106b may determine, in act 206, whether configuration data is needed for performing the check. If no configuration information is needed for the check, the stateful verifier 106b runs the check in act 208, and in act 210, marks the check in the Done Table as having been completed.

If configuration data is needed, the stateful verifier 106b determines, in act 212, whether the configuration data is available. When the program is verified for the first time, the configuration is not available, resulting a determination of NO to the inquiry in act 212.

In act 214, a confirmation is made that the verification process is run for the first time. If the answer is NO, an error has occurred, and the error is returned in act 216. If it is confirmed that the verification process is run for the first time, metadata associated with the instruction that require the configuration data is retrieved from the program 110 and saved in a Metadata Table, in act 216. For example, if the configuration data requires memory boundaries that have not yet been allocated, the stateful verifier 106b may identify metadata such as memory address, memory offset, and/or the like, referenced in the program, and store the retrieved metadata in the Metadata Table.

In one embodiment, at least some of the configuration data is provided by the host 100 during a program execute stage. Thus, although not available during the first run of the verification at program load time, the configuration data may be available during a second (and later) runs of the verification at program execute time(s). Thus, if the answer is YES in act 212, the stateful verifier 106b searches the Cache Table in act 218, for determining whether the check relating to the configuration data has been performed.

In act 220, a determination is made as to whether results of the check for the configuration data is available in the Cache Table. In one embodiment, results of prior checks based on the configuration data are stored in the Cache Table to avoid re-running the same check at program execute time. If the result of the check is available in the Cache Table, the result is retrieved from the table and returned in act 234.

If the configuration data is available for the first time during the second run of the verification, or if the configuration has changed since a prior check, the Cache Table may not yet have stored results of the check, and the answer to the query in act 220 is NO.

In act 224, the stateful verifier 106b reads the metadata associated with the configuration data from the Metadata Table.

In act 226, the stateful verifier 106b runs the check based on the retrieved metadata and the now-available configuration data.

In act 228, a determination is made as to whether this is a first run of the verification as certain configuration data may be available during the first run. If the answer is YES, the check is marked as done, in act 230, in the Done Table.

For second and later runs of the verification, the result of the check is saved in the Cache Table in act 232. The saved result may indicate that the check has passed or failed.

Figure 4A:
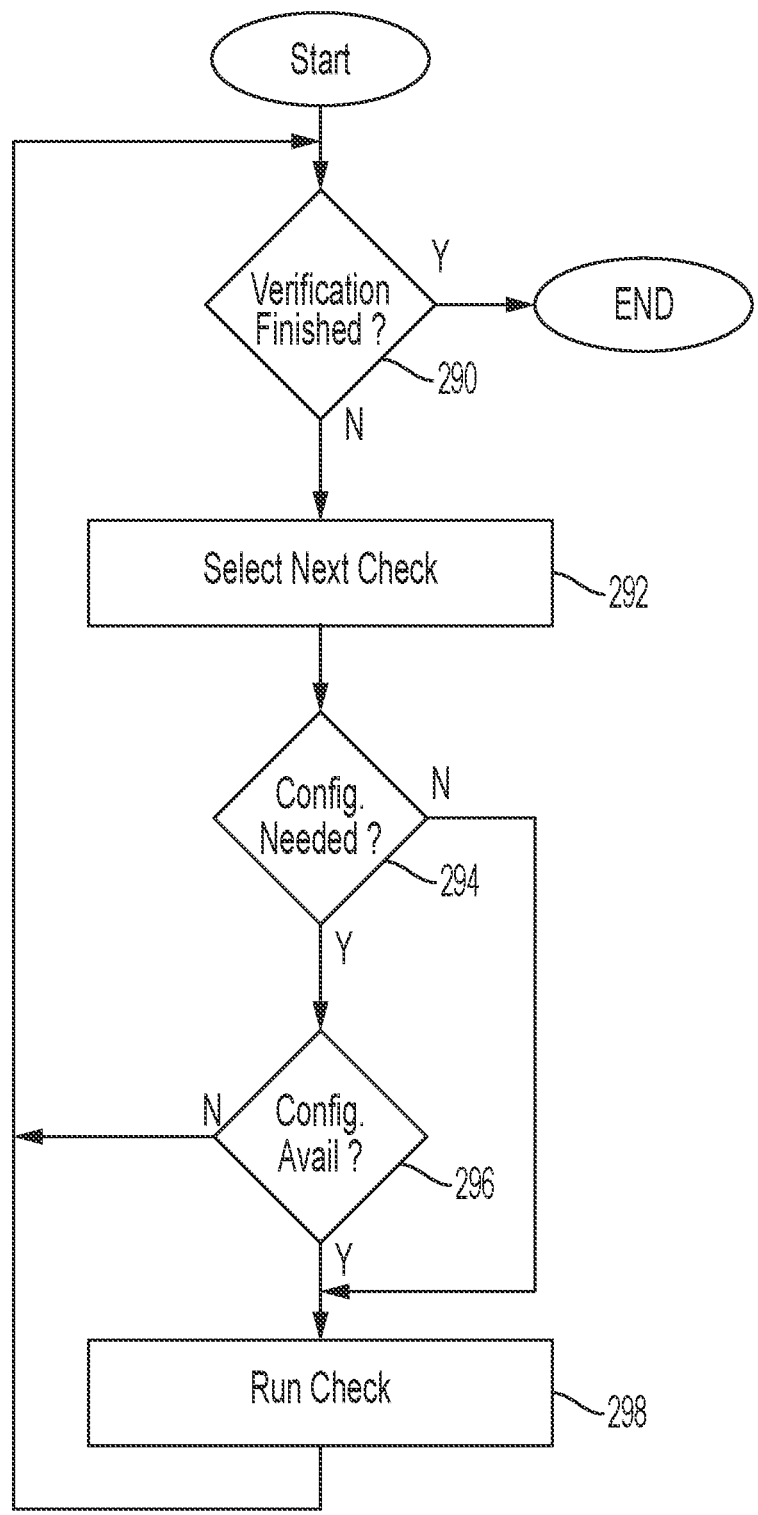
FIG. 4A is a flow diagram of a verification process executed by a stateful verifier in a host in a hybrid process for verifying program states, according to one embodiment.
Figure 4B:
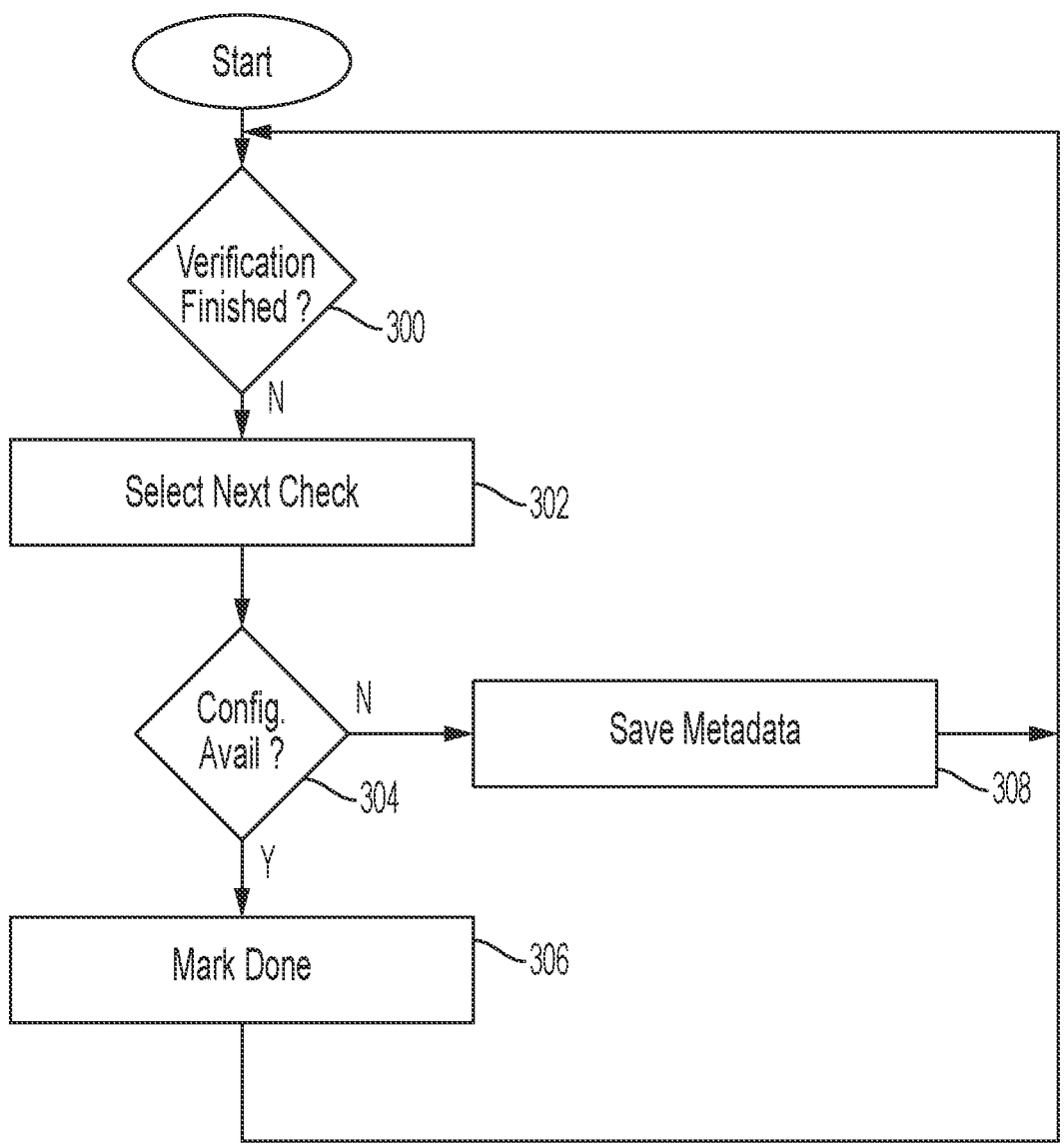
FIG. 4B is a flow diagram of a verification process executed by a stateful verifier in a computational storage device during a first run of a hybrid process for verifying program states, according to one embodiment.
Figure 4C:
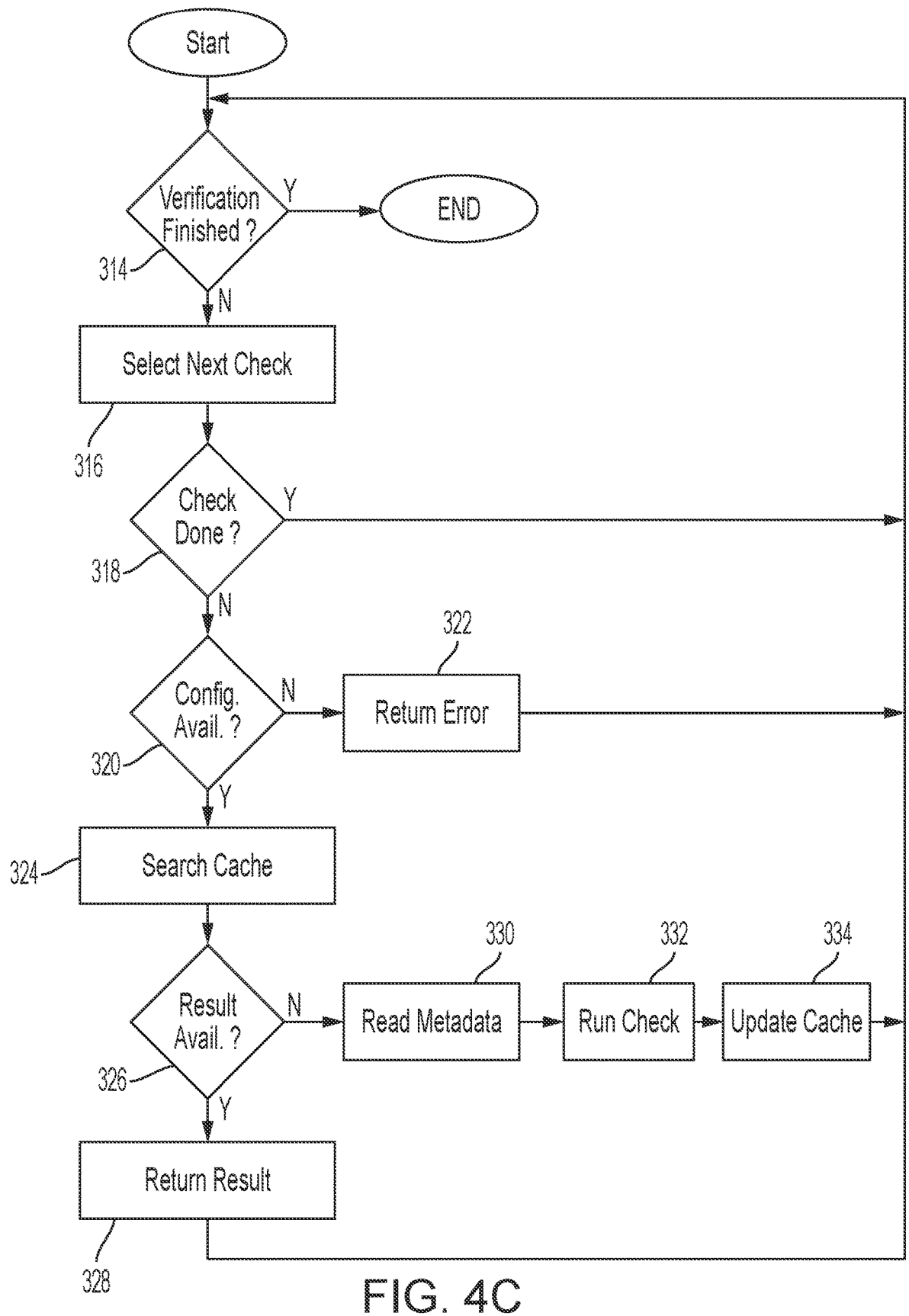
FIG. 4C is a flow diagram of a verification process executed by a stateful verifier in a computational storage device during second and later runs of a hybrid process for verifying program states, according to one embodiment.

FIGS. 4A-4C are flow diagrams of a hybrid process for verifying program states via the stateful verifier 106a in the host 100, and the stateful verifier 106b in the computational storage device 102, according to one embodiment. The hybrid verification process of FIGS. 4A-4C may be similar to the device-driven verification process of FIG. 3, except, that the stateful verifier 106a in the host is also involved in the process. A benefit of having the host involved may be to improve performance of the storage device 102 by having the processor perform some of the checks. In addition, if the same program 110 is run on multiple storage devices 102, running at least a first run of the check by the host 100 may eliminate the running of the same check by the multiple storage devices 102.

FIG. 4A is the verification process executed by the stateful verifier 106a in the host according to one embodiment. In one embodiment, the stateful verifier 106a in the host 100 performs a first check of the program, performing checks where configuration data is available or not needed. The check may be performed, for example, in response to a trigger to load/activate the program.

In this regard, in act 290, the stateful verifier 106a determines whether all checks of the program 110 have been run, and the verification process is complete. If the answer is YES, the process ends.

If the verification process is not complete, the stateful verifier 106a runs through the checks and performs the ones that it is able to perform. In this regard, the stateful verifier 106a selects a check to be performed in act 292.

In act 294, the stateful verifier 106a determines whether configuration data is needed for performing the check. If no configuration information is needed for the check, the stateful verifier 106a runs the check in act 298.

If configuration data is needed, the stateful verifier 106a determines, in act 296, whether the configuration data is available. If the configuration data is available, the check is run. If configuration data is not available, the check is skipped, and a next check is retrieved. In some embodiments, the stateful verifier 106a may populate a Done Table for indicating the checks that have been performed.

FIG. 4B is a flow diagram of the verification process executed by the stateful verifier 106b in the computational storage device 102, during a first run of the verification process, according to one embodiment. The first run may be invoked in response to a program load command from the host 100. The verification by the computational storage device 102 in the first run may be similar to the verification done by the host 100 in the first run, except that, in one embodiment, the stateful verifier 106b in the computational storage device 102 does not perform checks in the first run as such checks are performed by the host 100. The first run verification varication by the computational storage device 102 may be for building the Done Table and the Metadata Table.

The process starts, and in act 300, the stateful verifier 106b determines whether all checks of the program 110 have been run, and the verification process is complete. If the answer is YES, the process ends.

If the verification process is not complete, the stateful verifier 106b runs through the checks and generates the Done Table to identify checks that require configuration data. In this regard, in act 302, the stateful verifier 106b selects a next check to the performed, and determines, in act 304, whether the check is one that requires configuration data, and if so, whether configuration data is available. If the answer is YES, the stateful verifier marks, in the Done Table, in act 306, that the check is done.

If the configuration data is not available, the stateful verifier 106a retrieves associated metadata from the program 110, in act 308, and saves the metadata in the Metadata Table. The check that requires the configuration data may optionally be marked as "not done" in the Done Table. The process may then repeat with a next check.

FIG. 4C is the verification process executed by the stateful verifier 106b in the device 102 during the second and later runs of the verification process according to one embodiment. The second and later runs may be invoked in response to a program execute command from the host 100. In one embodiment, the program execute command and provide configuration data missing during the first run of the verification check.

The process starts, and in act 314, the stateful verifier 106b determines whether all checks of the program 110 have been run, and the verification process is complete. If the answer is YES, and all checks have passed, the program 110 may be executed by the computational storage device 102.

If the verification process is not complete, the stateful verifier 106b selects, in act 316, a check to perform.

In act 318, the stateful verifier 106b determines whether the selected check has already been performed. In this regard, the stateful verifier 106b checks the Done Table for determining whether the selected check has already been performed.

If the answer is YES, the check need not be performed again.

If the answer is NO, the stateful verifier 106b determines, in act 320, whether configuration data is available. If the answer is NO, an error is returned in act 322 as configuration data is expected to be available in the second and later runs.

If configuration data is available, the stateful verifier 106b searches the Cache Table, in act 324 for the particular configuration data, and determines, in act 326, whether a result of the check is available for the particular configuration data. If the result is available, the result is retrieved from the Cache Table and returned in act 328.

If the result is not available, the stateful verifier 106b reads, in act 330, the metadata associated with the configuration data from the Metadata Table.

In act 332, the stateful verifier 106b runs the check based on the retrieved metadata and the configuration data.

In act 334, the result of the check is saved in the Cache Table in association with the configuration data, and the process moves on to perform a next check.

Figure 5A:
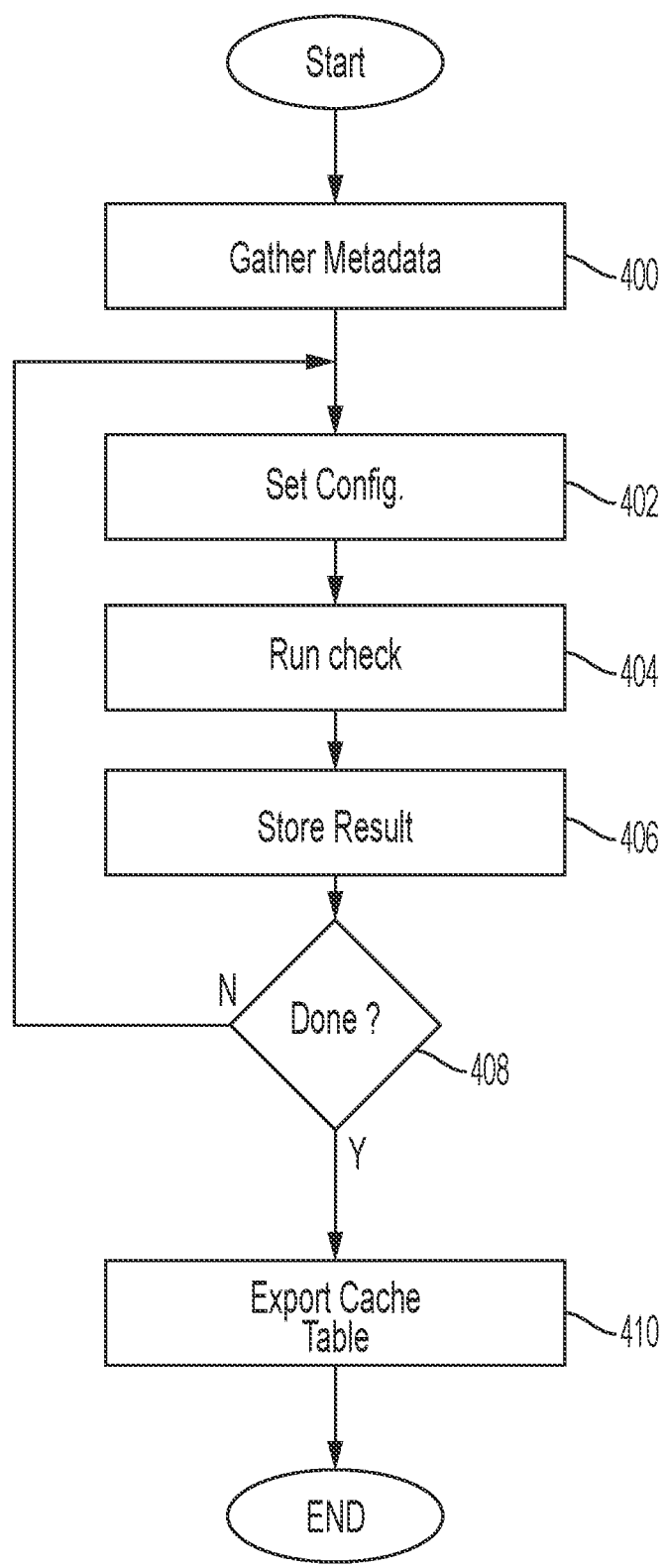
FIG. 5A is a flow diagram of a process for running verification checks by a host by simulating execution of a program in an isolated and controlled execution environment according to one embodiment.
Figure 5B:
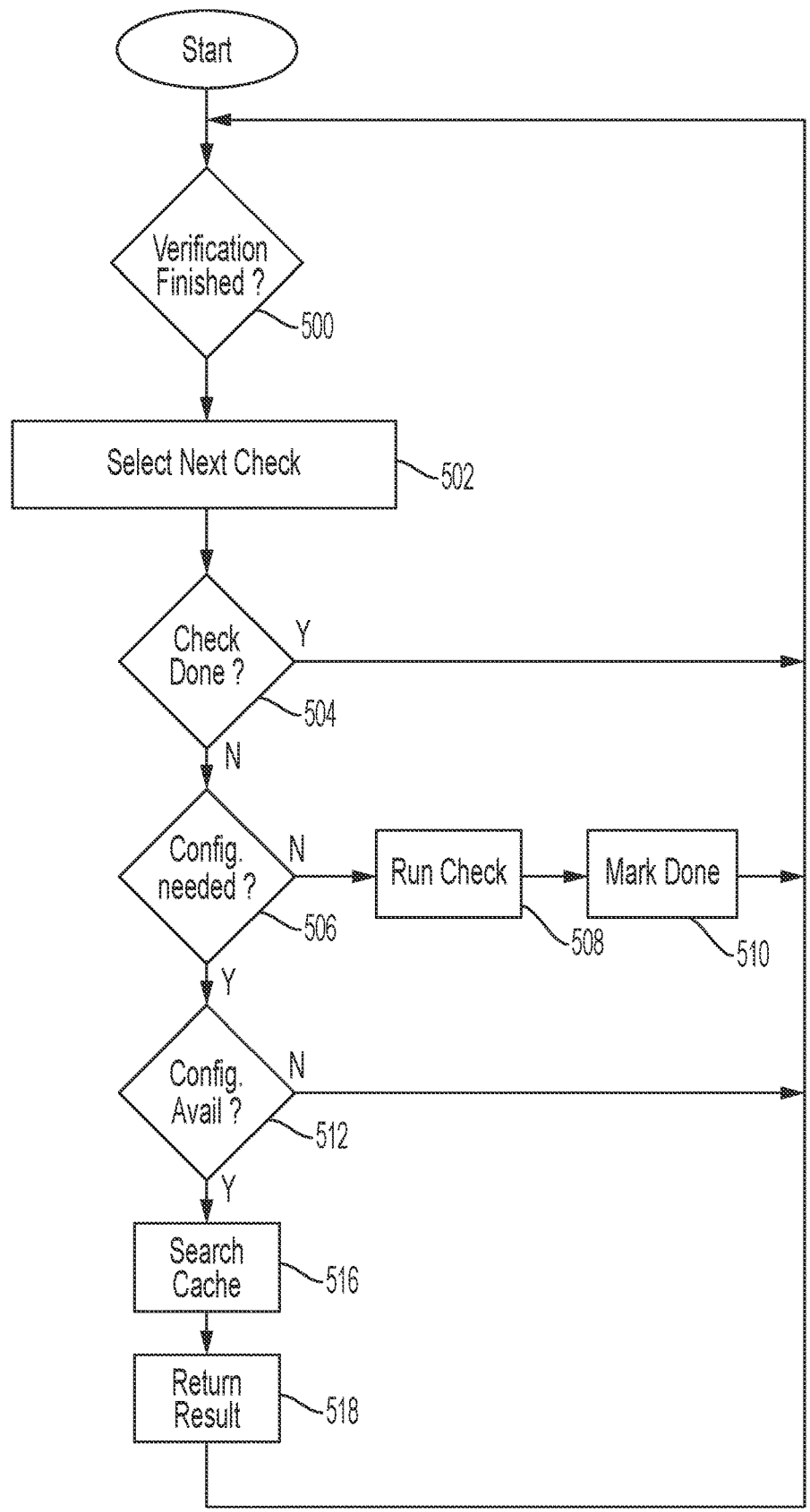
FIG. 5B is a flow diagram of a verification process executed by a stateful verifier in a host outside of a simulation mode, using pre-generated cache tables according to one embodiment.

FIGS. 5A-5B are host-driven processes for verifying program states via the stateful verifier 106a in the host 100 according to one embodiment. In the host-driven processes of FIGS. 5A-5B, the verifier 106a in the host 100 may run the verification checks by simulating execution of the program in an isolated and controlled execution environment, which may be referred to as a sandbox. During the sandbox simulation (described with reference to FIG. 5A), different variations of the configuration data may be checked, and a cache table of the results may be built for use by the stateful verifier 106a outside of the simulation mode (described with reference to FIG. 5B). Although the sandbox simulation is described as being performed by the stateful verifier 106a in the host 100, a person of skill in the art should recognize that the simulation may be invoked by a separate program within the host 100 or outside of the host. Results of the simulation program may be stored in the Cache Table, and loaded to the host 100 along with the program 110.

With reference to FIG. 5A, the sandbox simulation process starts, and in act 400, the stateful verifier 106a identifies instructions of the program 110 that require configuration data, and gathers metadata for those instructions.

In act 402, the stateful verifier 106a selects a configuration value, and in act 404, runs a check based on the metadata and the selected configuration value. In this regard, different configuration values may be selected for building the Cache Table.

In act 406, the results of the check (for example, pass or no pass) is stored in the Cache Table.

In act 408, a determination is made as to whether the simulation is complete. The simulation may be complete when different possible configurations are tested for the gathered metadata. For example, if the configuration data relates to buffer size, possibilities of different buffer sizes are selected, checked, and corresponding results are stored in the Cache Table.

If the simulation is complete and the Cache Table has been built, the Cache Table is exported to the host 100 for use by the stateful verifier 106a outside of the sandbox simulation. For example, if the sandbox simulation is performed by a third party, the generated Cache Table may be exported to the stateful verifier 105a for use in running verifications of the program 110 at program load and execute times.

FIG. 5B is a flow diagram of the verification process executed by the stateful verifier 106a in the host 100 outside of the simulation mode, using pre-generated cache tables according to one embodiment. The process starts, and in act 500, the stateful verifier 106a determines whether all checks of the program 110 have been run, and the verification process is complete. If the answer is YES, and all checks have passed, the program 110 may be loaded and/or executed by the computational storage device 102.

If the verification process is not complete, the stateful verifier 106a selects, in act 502, a check to perform.

In act 504, the stateful verifier 106a determines whether the selected check has already been performed. The answer is presumed to be NO for a first run of verification process (for example, in response to a program load command). For subsequent runs of the verification process (for example, in response to a program execute command), the stateful verifier 106a may check the Done Table for identifying those checks that have been performed during the first run, and identifying those checks that have not been run. In one embodiment, checks that require configuration data are not completed in the first run, and hence, not marked as being completed in the Done Table.

In act 506, if a check is not done, a determination is made as to whether configuration data is needed for the check. If the answer is NO, the check is run in act 508, and marked as being completed in the Done Table in act 510.

If configuration data is needed, a determination is made as to whether configuration data is available in act 512. If the configuration data is not available (for example, during a first run of the verification), the process moves on to perform a next check.

If configuration data is available (for example, during a second or subsequent run of the verification), the stateful verifier 106a searches, in act 516, the exported Cache Table for the check results stored in association with the configuration data.

In act 518, the results are returned, and the process moves on to perform a next check.

With respect to the flow diagrams of FIGS. 2-4, it should be understood that the sequence of steps of the process is not fixed, but can be modified, changed in order, performed differently, performed sequentially, concurrently, or simultaneously, or altered into any desired sequence, as recognized by a person of skill in the art.

Figure 6:
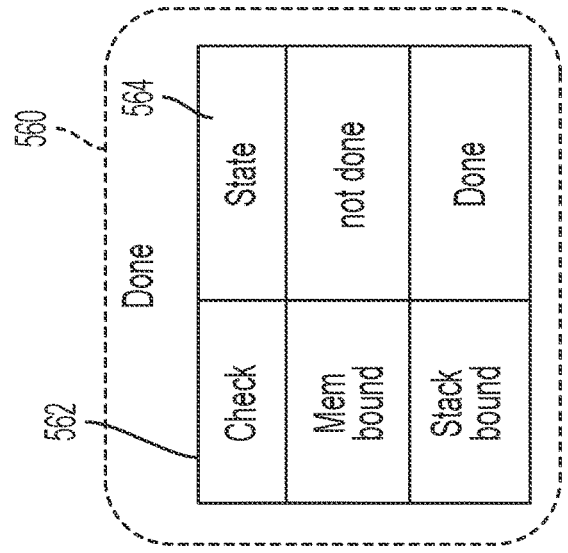
FIG. 6 is an example table of verification checks along with an indication of whether the verification checks were completed, according to one embodiment.

FIG. 6 is an example Done Table 560 according to one embodiment. The table 560 may include a list of checks 562 performed or attempted to be performed by the stateful verifier 106 during a first run of the verification process, along with a status/state 564 as done, not done, or the like. In one embodiment, a check that is completed in the first run is marked as done, and a check that requires configuration data that is not available in the first run is marked as not done. The Done Table may be stored, for example, in the memory 108 of the host 100, and/or the memory 126 of the computational storage device 102.

Although in the example of FIG. 6 checks that are not completed in the first run are indicated as "not done," in other examples, the state information may be left blank. In other examples, the Done Table may only include those checks that have been completed, with the assumption that if a check is not included in the Done Table, the check could not be performed in the first run.

Figure 7:
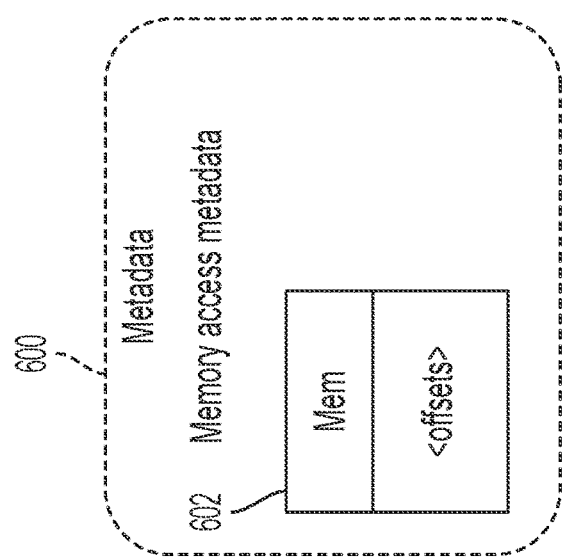
FIG. 7 is an example table of metadata gathered from a program to be verified according to one embodiment.

FIG. 7 is an example Metadata Table 600 according to one embodiment. The table 600 may include metadata 602 associated with program instructions that require configuration data. For example, the metadata 602 may be memory access metadata including, for example, memory offsets, type and size of program arguments, and/or the like. The Metadata Table 600 may be stored, for example, in the memory 126 of the computational storage device 126.

Figure 8:
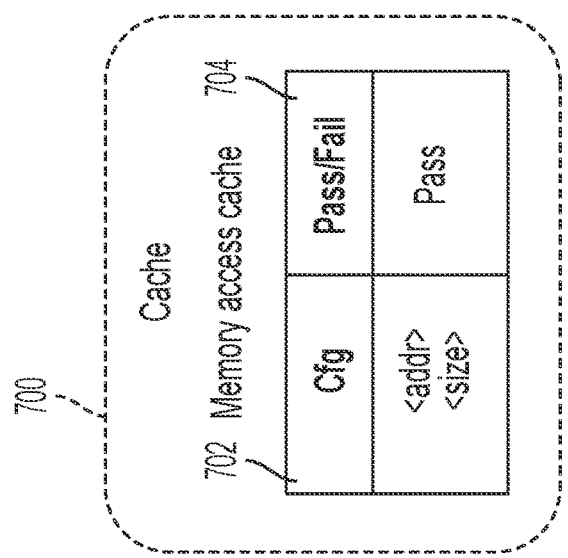
FIG. 8 is an example table of configuration data and results of verification checks based on the configuration data according to one embodiment.

FIG. 8 is an example Cache Table 700 according to one embodiment. The table 700 may include configuration data 702 including, for example, memory address, memory size, program arguments, and the like, and check results 704 (for example, pass or no pass) of the verification. The Cache Table 700 may be stored, for example, in the memory 108 of the host 100, and/or the memory 126 of the computational storage device 102.

In some embodiments, the systems and programs for verifying program states discussed above, are implemented in one or more processors. The term processor may refer to one or more processors and/or one or more processing cores. The one or more processors may be hosted in a single device or distributed over multiple devices (for example, over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (for example, memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of systems and methods for verifying program states have been specifically described and illustrated herein, many modifications and variations will be apparent to those skilled in the art. Accordingly, it is to be understood that systems and methods for verifying program states constructed according to principles of this disclosure may be embodied other than as specifically described herein. The disclosure is also defined in the following claims, and equivalents thereof.

What is claimed is:

1. A method for checking program code having a program instruction, the method comprising:
   in response to a first command from a host computing device in communication with a computational storage device of a computing system to load the program code, executing by the host computing device a first check of the program code loaded into the computing system for execution, wherein the first check includes making a determination about availability of memory configuration data for the program instruction, wherein the memory configuration data is for configuring a memory for executing the program code;
   identifying, based on the determination about the availability of the memory configuration data, metadata for accessing the memory by the program instruction; and
   storing the metadata in a first data structure in the memory;
   in response to a program execute command from the host computing device to execute the program code, running, by the computational storage device in an execution mode of the program code, a second check of the program code, wherein the running of the second check includes:
      identifying the memory configuration data in the memory;
      retrieving the metadata by accessing the memory from the first data structure;
      determining validity of access to the memory by the program instruction based on the memory configuration data and the metadata;
      building a second data structure in the memory; and
      storing a result of the second check in the second data structure in the memory; and
   executing by the computing system the program code based on the stored result of the second check determining the validity of access to the memory.

2. The method of claim 1 further comprising:
   running a third check of the program code;
   retrieving the result in response to running the third check; and
   executing the program code.

3. The method of claim 2, wherein the third check is in response to executing the program code, wherein the result is retrieved from the second data structure in response to the third check.

4. The method of claim 1, wherein the program code is generated in a user space of a processing device of the computing system, and executed in a kernelspace of the processing device.

5. The method of claim 1, wherein the first check and the second check are performed by the computational storage device.

6. The method of claim 1, wherein the metadata for accessing the memory is retrieved from the program code.

7. A method for checking program code having a program instruction, the method comprising:
   running by a computing system, in an execution environment satisfying a criterion, a simulation of checks of the program code loaded into the computing system for execution by a processing device, wherein the running of the simulation includes, in a simulation mode:
      running a first check including making a first determination about availability of memory configuration data for the program instruction;
      identifying metadata for accessing the memory by the program instruction;
      storing the metadata in a first data structure in a memory;
      identifying a trigger for executing the program code; and
      based on identifying the trigger, running, in an execution mode of the program code, a second check of the program code based on the memory configuration data and the metadata stored in the first data structure, the second check checking for validity of access to the memory by the program instruction;
      building a second data structure in the memory;
      storing a result of the second check of the simulation in the second data structure in the memory;
   executing, by the computing system, the checks of the program code outside of the simulation, wherein the executing of the checks of the program code outside of the simulation includes checking for validity of access to the memory by the program instruction outside of the simulation mode;
   making, by the computing system, a second determination about the checks of the program code outside of the simulation in the execution mode of the program code;
   retrieving, by the computing system, the result stored in the second data structure in the memory based on the second determination; and
   executing, by the computing system, the program code based on the result stored in the second data structure.

8. The method of claim 7, wherein the executing of the check is in response to a command to execute the program code.

9. The method of claim 7, wherein the determination is a determination that the memory configuration data is needed for making the check.

10. The method of claim 9, wherein the result is stored in association with the configuration data.

11. The method of claim 7, wherein in running the simulation, a determination is made that the memory configuration data is needed for the check, the method further comprising:
 selecting the memory configuration data; and
 running the simulation of the check based on the memory configuration data.

12. A system for checking program code having a program instruction, the system comprising:
 one or more processors; and
 one or more memory devices, wherein the one or more memory devices store instructions that, when executed by respectively the one or more processors, cause the one or more processors to respectively:
  in response to a first command from a host computing device in communication with a computational storage device of a computing system to load the program code, execute by the host computing device a first check of the program code loaded into the computing system for execution, wherein the first check includes instructions that cause the one or more processors to make a determination about availability of memory configuration data for the program instruction, wherein the memory configuration data is for configuring one of the one or more memory devices for executing the program code;
  identify based on the determination about the availability of the memory configuration data, metadata for accessing the one of the one or more memory devices by the program instruction; and
  store the metadata in a first data structure in the one or more memory devices;
  in response to a program execute command from the host computing device to execute the program code, run, by the computational storage device in an execution mode of the program code, a second check of the program code, wherein the second check include instructions that cause the one or more processors to:
   identify the memory configuration data in the one or more memory devices;
   retrieve the metadata by accessing the one of the one or more memory devices from the first data structure;
   determine validity of access to the one of the one or more memory devices by the program instruction based on the memory configuration data and the metadata;
   build a second data structure in the one or more memory devices; and
   store a result of the second check in the second data structure in the one or more memory devices; and
  execute by the computing system the program code based on the stored result of the second check determining the validity of access to the one or more memory devices.

13. The system of claim 12, wherein the one or more processors and the one or more memory devices are included in the computational storage device.

14. The system of claim 12, wherein the first check is performed by a first one of the one or more processors in the host computing device, and the second check is performed by a second one of the one or more processors in the computational storage device in communication with the host computing device.

15. The system of claim 12, wherein the metadata for accessing the one of the one or more memory devices is retrieved from the program code.

* * * * *